Nov. 2, 1926.
G. CLAUDE
SYNTHESIS OF AMMONIA
Filed Nov. 18, 1921
1,605,647
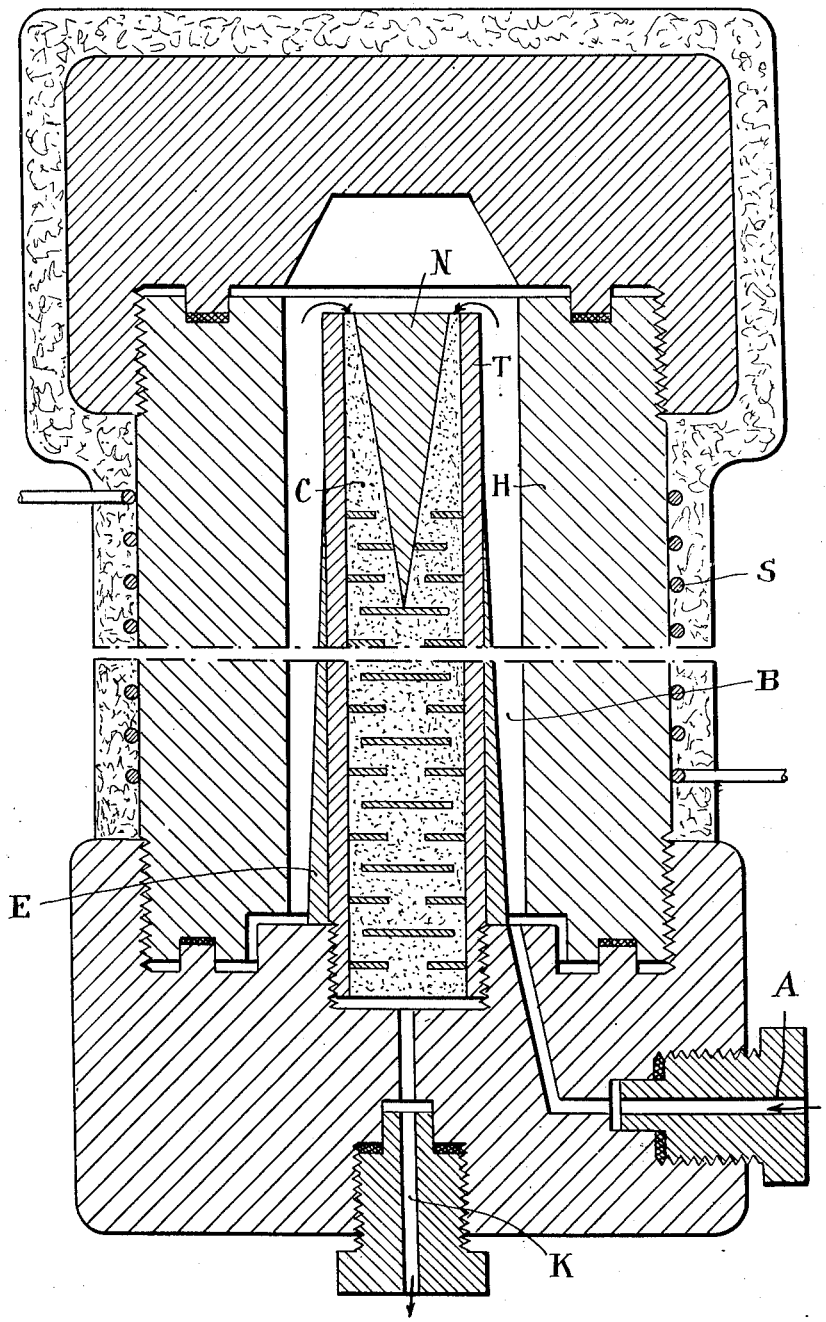
INVENTOR
Georges Claude
BY
Pennie Davis Marvin & Edmonds
his ATTORNEYS Patented Nov. 2, 1926.

1,605,647

UNITED STATES PATENT OFFICE.

GEORGES CLAUDE, OF PARIS, FRANCE, ASSIGNOR, BY MESNE ASSIGNMENTS, TO LAZOTE INC., A CORPORATION OF DELAWARE.

SYNTHESIS OF AMMONIA.

Application filed November 18, 1921. Serial No. 516,045.

The present invention relates to the synthesis of ammonia and more particularly to the process according to my prior U. S. Letters Patent No. 1,501,436, issued July 15, 1924.

According to said process, the gases to react are heated by indirect contact with the catalyzing substance with the interposition of a wall possessing a heat conductivity such as these gases arrive under normal working on the catalyzing substance at a temperature, preferably the lowest, which permits the normal maintenance of the reaction.

According to the present invention the thermic conductivity of the wall, for instance of the tube containing the catalyzing substance, is arranged to comply with a supplementary condition. Not only is the conductivity of the whole of this tube arranged to present such a value that the gases reach the catalyzing material at a suitable temperature, but it is arranged that the conductivity of each zone of the tube is such that the heat evolved inside this zone by the reaction is transmitted there as exactly as possible to the external gases. By these means, and specially in the case of hyperpressures owing to the high factor of combination produced by suitable hyperpressures, an ideal condition is approached consisting in the reaction being effectuated throughout the whole length of the catalyzing material at as uniform and as low a temperature as possible, permitting a good yield, which is highly desirable for the carrying out of the reaction itself and also for the preservation of the catalyzing material. With the active catalyzing substances now used, these suitable hyperpressures are of the order of 1000 atmospheres; with less active substances, they would be higher and with more active substances they would be less.

In order to attain the additional condition just referred to, it is necessary that the value of the heat insulation, if this means be employed to obtain a poor calorific conductivity, should decrease rapidly from the entrance into the outer tube of the reacting gases, where the reaction is but slightly intense and where there is the maximum difference in temperature, up to the other end, where the difference in temperature is theoretically nil, and where consequently the heat insulation should be nil. Calculation, or at least a simple experiment, furthermore, permits of the easy determination of the general outline of the law of the necessary variation of this heat insulation coating or jacket.

The conditions necessary for the above mentioned variation, especially in large apparatus, can be obtained by using an inner tube of metal that is a poor conductor and of suitably varying thickness from one end to the other.

The conditions set forth above are, evidently, only exact if the circulation of the reacting gases through the catalyzing mass is uniform.

Now it may happen, especially in tubes of large section and principally in the regions where the reaction is most intense, that there is a large excess of temperature in the central regions of the catalyzing material as compared with its periphery where the cooling is effected by the external current of gas. This, therefore, is opposed to the desideratum of the uniformity of temperature in the whole of the catalyzing mass and entails a more rapid deterioration of the catalyzer. In order to remedy this defect, according to the present invention, all of the gases may be forced to come in contact with the wall, at fairly close intervals, in such a way that each time mixture of the cold and warm parts is effected. An arrangement, enabling this result to be simply attained, consists, for example, in inserting whilst the tube is being charged with catalyzing material, from place to place, washers (of sheet metal for example) having a diameter slightly less than the tube, and alternately solid and perforated near the centre. Instead of these washers use could be made of solid disks, with cuts or notches therein, the cuts in the successive washers being displaced with regard to each other in such a way that the gases in passing through these cuts, are compelled to circulate through the tube T in a tortuous path.

The present invention also aims at overcoming some difficulties which may arise, especially with catalyzer tubes for large capacity, especially when these tubes are short and of large diameter. In the first place as the reaction tends to be very intense where the reacting gases first impinge on the catalyzer and as the ratio of the surface for heat transmission to the internal volume is very small it may happen that, in spite of the complete absence of a heat insulation in this region of the surrounding tube it may be quite impossible to evacuate all the heat produced proportionately to its generation thus, contrary, to the desideratum set forth, the temperature of the reacting gases will rise more or less above the admission temperature in this part of its path, to the prejudice of the life of the catalyzing material and that of the catalyzer tube.

In order to obviate this drawback according to the present invention use may be made, in combination or not with the features hereinbefore referred to, of a catalyzing mass, the activity of which increases from the point of arrival of the hot gases up to their point of exit. To this end use may, for example, be made, towards the place at which the gases impinge upon the catalyzing material of a series of layers of different catalyzing materials of an activity which increases from this entrance of the gases. A similar result may be obtained by diminishing the volume of the catalyzing material without diminishing the heat transmitting surface. To this end a reduction may be made, for example, in the cross section of the passage for the gases through the catalyzing material for example by partly stopping up the passage over a certain length by means of a suitable material.

The figure of the accompanying drawing shows diagrammatically an apparatus provided with variable heat insulation. The catalyzing material, designated by C, is contained in a tube T surrounded by an insulating material E forming with the tube T a wall, the thickness of which decreases. The insulating material may terminate before reaching the end of the tube T. The gases enter through an inlet A and pass along a passage B between the pressure-sustaining shell H and the insulating material E to the catalyst and escape through an outlet K. Inside the tube T a core N of inert material and of decreasing cross section may be placed so as to extend over a certain length of the nonheat insulated or less heat insulated portion of the inner tube. Washers D may be disposed within the catalyst for the purpose hereinbefore described.

The outer shell H supporting the pressure and submitted to the direct contact of the gases may be surrounded by a heat insulattion in order to take profit of the advantages shown in my prior U. S. application No. 458,848 filed April 5, 1921.

The gases which are to react arriving through the inlet A become progressively heated in B, this taking place under the best conditions owing to the presence of the heat-insulating material E of decreasing thickness so that the gases arrive at the desired temperature of the catalyzing material which they traverse after circulating first all around the core N.

The obtaining and preservation of the exact value required for the conductivity at each point of the tube T eventually presenting some difficulties and the conditions of pressure, composition of the reacting gases, quality and preservation of the catalyzing material, etc., being liable to vary, the necessary temperature may be maintained of course by regulating means consisting, for example, in the use of electric heating circuits S for the external heating of the tube H this heating being otherwise maintained permanently if the pressure has a value under that suitable which is necessary to ensure spontaneously, with the catalyzing substance employed and the rate of reaction chosen, the necessary temperature, that "suitable" value being of the order of 1000 atmospheres with the good usual catalyzing substances.

I claim:

1. The method of conducting catalytic exothermic synthesis under pressure, which comprises heating the gases to react by heat exchange with successive zones of the catalyst while absorbing heat by these gases from the successive zones proportionally to the amount of heat evolved by the reaction in each zone.

2. The method of conducting catalytic exothermic synthesis under pressure, which comprises heating the gases to react by heat exchange with successive zones of the catalyst while effecting the reaction in the successive zones of the catalyst at a substantially uniform temperature.

3. The method of conducting catalytic exothermic synthesis under pressure, which comprises heating the gases to react by heat exchange with successive zones of the catalyst while absorbing heat by these gases from the successive zones and ensuring substantial uniformity of the temperature of the catalyst in the successive zones by transferring heat to the gases proportionally to the amount of heat evolved in each zone.

4. The method of conducting catalytic exothermic synthesis under pressure, which comprises heating the gases to react by heat exchange with successive zones of the catalyst while absorbing heat by these gases from the successive zones proportionally to the amount of heat evolved by the reaction in each zone and increasing uniformly the cross-sectional area of the catalyst in the direction of travel of the gases therethrough.

5. The method of effecting catalytic exothermic synthesis under pressure, which comprises delivering the gases to be combined to and passing them through a catalyst having a cross-sectional area increasing in the direction of flow of the gases.

6. The method of effecting catalytic exothermic synthesis under pressure which comprises delivering the gases to be combined to and passing them through a catalyst having a cross-sectional area increasing uniformly in the direction of flow of the gases.

7. The method of conducting the catalytic synthesis of ammonia under pressure, which comprises heating the gases to react by heat exchange with successive zones of the catalyst while absorbing heat by these gases from the successive zones proportionally to the amount of heat evolved by the reaction in each zone.

8. An apparatus for catalytic exothermic synthesis in which the gases are heated by heat exchange with the catalyst, which comprises an inner tube with the catalyst supported thereby, a layer of heat-insulating material surrounding and in direct contact with the tube, the heat conductivity of the insulating material varying along the axis of the tube and a pressure-sustaining wall spaced from the heat-insulating layer to provide a passage for the gases.

9. An apparatus for catalytic exothermic synthesis in which the gases are heated by heat exchange with the catalyst, comprising a pressure-sustaining shell, a wall within the shell surrounding and in direct contact with the catalyst, the space between the shell and the wall being adapted for the passage of the gases to be combined in heat exchange relation with the wall, the heat conductivity of which varies.

10. An apparatus for catalytic exothermic synthesis in which the gases are heated by heat exchange with the catalyst, comprising a pressure-sustaining shell, a wall within the shell surrounding and in direct contact with the catalyzing material, the space between the shell and wall being adapted for the passage of the gases to be combined in heat exchange relation with the wall, the thickness of the wall decreasing from the end opposite the entrance of the gaseous mixture to the catalyst.

11. In an apparatus for effecting catalytic exothermic synthesis, a receptacle, a body of catalyst therein and means for directing the gases to be combined into the receptacle, the catalyst increasing in cross-sectional area in the direction of flow of the gases therethrough.

12. In an apparatus for effecting catalytic exothermic synthesis, a receptacle, a body of catalyst therein and means for directing the gases to be combined into the receptacle, the catalyst increasing uniformly in cross-sectional area in the direction of flow of the gases therethrough.

In testimony whereof I, GEORGES CLAUDE, have signed this specification.

GEORGES CLAUDE.